United States Patent
Stang

(10) Patent No.: US 8,004,384 B2
(45) Date of Patent: Aug. 23, 2011

(54) FUSED LOAD INTERRUPTER, SWITCHGEAR SYSTEM, AND ADAPTER PART

(75) Inventor: Alfred Stang, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 214 days.

(21) Appl. No.: 12/311,357

(22) PCT Filed: Sep. 27, 2007

(86) PCT No.: PCT/EP2007/060278
§ 371 (c)(1),
(2), (4) Date: Mar. 27, 2009

(87) PCT Pub. No.: WO2008/037776
PCT Pub. Date: Apr. 3, 2008

(65) Prior Publication Data
US 2010/0019877 A1    Jan. 28, 2010

(30) Foreign Application Priority Data
Sep. 29, 2006  (DE) .................. 10 2006 047 352

(51) Int. Cl.
*H01H 85/20* (2006.01)
*H01H 85/22* (2006.01)
*H01R 24/00* (2011.01)

(52) U.S. Cl. ........ 337/209; 337/158; 337/168; 337/208; 337/142; 361/608; 361/611; 361/624; 361/626; 361/642; 361/649

(58) Field of Classification Search .................. 337/158, 337/168, 208, 209; 361/608, 611, 624, 626, 361/642, 649
See application file for complete search history.

(56) References Cited

U.S. PATENT DOCUMENTS

| | | | | |
|---|---|---|---|---|
| 3,054,874 A | * | 9/1962 | Dickinson et al. | 337/146 |
| 3,274,356 A | * | 9/1966 | Godfrey | 337/189 |
| 4,183,608 A | * | 1/1980 | Nicholls | 439/620.26 |
| 6,459,353 B1 | * | 10/2002 | Mattlar et al. | 337/9 |
| 6,650,222 B2 | * | 11/2003 | Darr et al. | 337/187 |
| 6,667,681 B1 | * | 12/2003 | Meiners et al. | 337/186 |
| 6,710,696 B2 | * | 3/2004 | Meiners et al. | 337/186 |
| 7,362,207 B2 | * | 4/2008 | Malingowski et al. | 337/206 |
| 7,561,018 B2 | * | 7/2009 | Buettner | 337/189 |

FOREIGN PATENT DOCUMENTS

| | | |
|---|---|---|
| DE | 74 03 812 U | 2/1974 |
| DE | 24 27 347 | 1/1975 |

(Continued)

OTHER PUBLICATIONS

German Search Report, Date Jan. 29, 2008, PCT/ISA/210.

*Primary Examiner* — Anatoly Vortman
(74) *Attorney, Agent, or Firm* — Harness, Dickey & Pierce, P.L.C.

(57) ABSTRACT

Fused load interrupters have up to now used claw terminals or screw connections for connecting to horizontal busbars in a switchgear unit. Fused load interrupters have not been suitable until now for connecting to vertical busbars in switchgear units. At least one embodiment of the invention provides a fused load interrupter with plug contacts, such as are known from load interrupters with fuses, thereby allowing fused load interrupters to replace the more expensive load interrupters with fuses in switchgear units with vertical busbars.

8 Claims, 2 Drawing Sheets

FOREIGN PATENT DOCUMENTS

| | | |
|---|---|---|
| DE | 24 27 347 A1 | 1/1975 |
| DE | 25 43 959 | 4/1977 |
| DE | 25 43 959 A1 | 4/1977 |
| DE | 82 03 080 | 8/1982 |
| DE | 82 03 080 U1 | 9/1982 |
| DE | 297 16 201 U1 | 1/1999 |
| DE | 100 55 035 | 5/2002 |
| DE | 100 55 035 A1 | 5/2002 |
| EP | 0 262 554 | 4/1988 |
| EP | 0 262 554 A2 | 4/1988 |

* cited by examiner

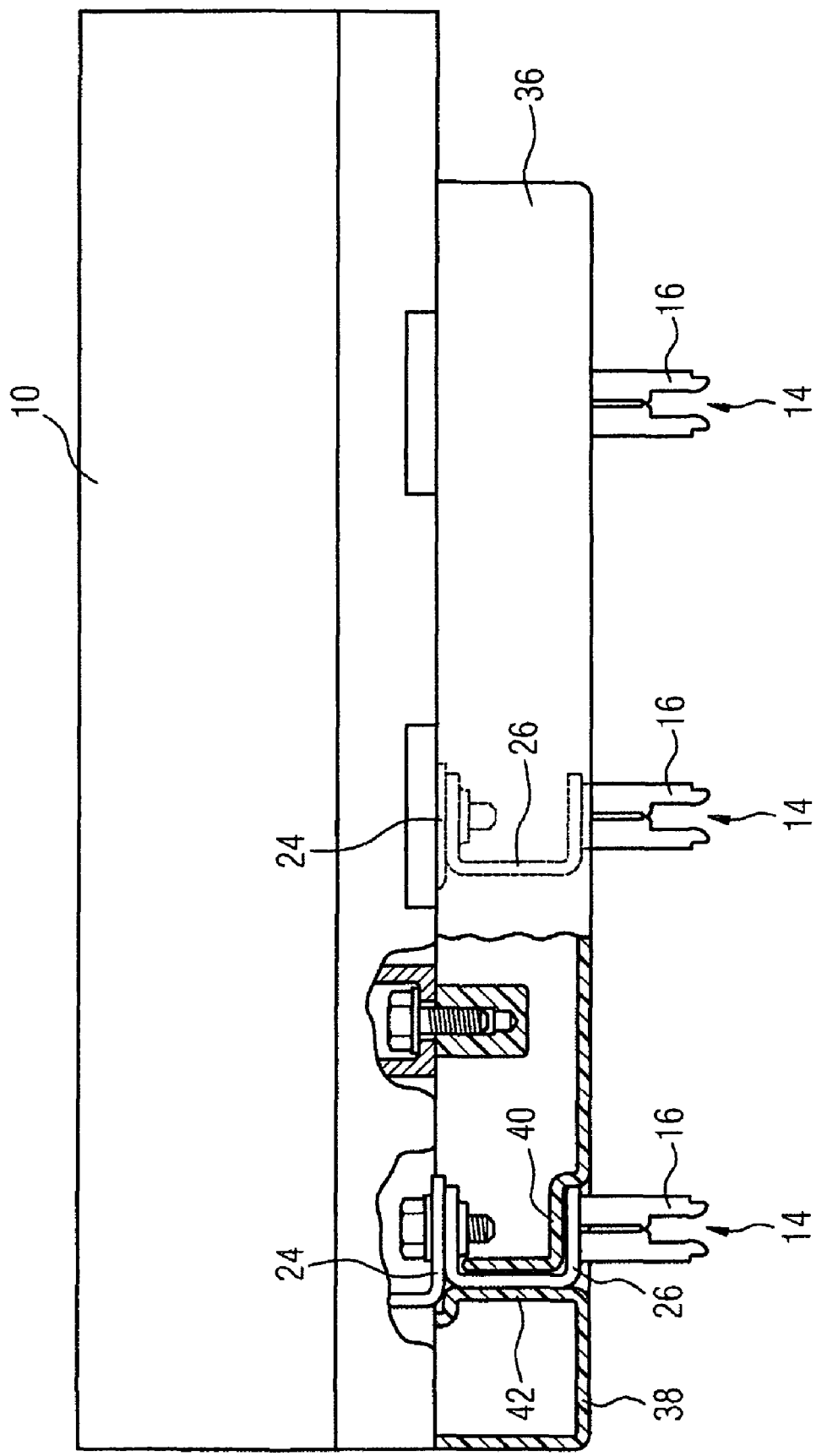

FUSED LOAD INTERRUPTER, SWITCHGEAR SYSTEM, AND ADAPTER PART

PRIORITY STATEMENT

This application is the national phase under 35 U.S.C. §371 of PCT International Application No. PCT/EP2007/060278 which has an International filing date of Sep. 27, 2007, which designated the United States of America and which claims priority to German Application No. 10 2006 047 352.3 which has a filing date of Sep. 29, 2006, the entire contents of which is hereby incorporated herein by reference.

FIELD

At least one embodiment of the invention generally relates to a fused load interrupter having three connections for in each case one busbar. At least one embodiment also generally relates to a switchgear assembly having three vertically running busbars onto which switches can be plugged by plug contacts. Furthermore, at least one embodiment of the invention generally relates to an adapter part for a fused load interrupter which allows the use of a fused load interrupter in a switchgear assembly such as this.

BACKGROUND

Fused load interrupters or load interrupters with fuses can be used in switchgear assemblies. The difference between them is that fused load interrupters are switched with the fuses, while load interrupters with fuses are not switched with the fuses.

In order to mount them on busbars of a switchgear assembly, fused load interrupters have a so-called claw terminal or a connecting lug, which surrounds a (threaded) hole, on the rear face for each busbar, thus allowing a screw connection. Fused load interrupters are normally used in switchgear assemblies in which the busbars run horizontally. The claw terminals and the screw connection are then arranged one above the other. Load interrupters with fuses have a plug contact toward the busbars on the rear face. They are normally used in switchgear assemblies having three vertically running busbars. There is therefore no choice for switchgear assemblies having three vertically running busbars, and, in fact, it is necessary to use load interrupters with fuses. Until now, it has not been possible to fit fused load interrupters there. When fused load interrupters and load interrupters with fuses have a similar functionality, this is disadvantageous since load interrupters with fuses are considerably more expensive.

SUMMARY

At least one embodiment of the invention provides a possible way of also using fused load interrupters in a switchgear assembly having three vertically running busbars.

According to at least one embodiment of the invention, the connections of the fused load interrupter are now in the form of plug contacts. Plug contacts can be used in switchgear assemblies having three vertically running busbars, as a result of which the fused load interrupters according to at least one embodiment of the invention offer the capability to equip the switchgear assembly with low-cost fused load interrupters.

The plug contacts may have two or four flexible plug pins. The plug pins can be formed in precisely the same way as those for the plug contacts of load interrupters with fuses. They may have two plug pins or four flexible plug pins. The plug pins offer particularly good retention.

In one embodiment of the invention, the entire fused load interrupter is not actually rebuilt. In fact, a fused load interrupter having three connecting lugs with (threaded) holes is used, which allow the fused load interrupter base component to be screwed to busbars. What is referred to here as a fused load interrupter base component is nothing more than a conventional fused load interrupter with a screw connection.

The fused load interrupter according to at least one embodiment of the invention comprises this fused load interrupter base component, with an adapter part on which the plug contents are formed being screwed to the connecting lugs. It is thus possible to build on a conventional fused load interrupter base component, the adapter part is screwed on quickly and can be produced at low cost, and a fused load interrupter which can be used in a switchgear assembly having three vertically running busbars can thus be provided with only a small amount of effort.

One modified embodiment is based on the same fused load interrupter base component, but using a single (superordinate) adapter part. This comprises a capability for the connection to the three connecting lugs, and the three plug contacts are formed in a corresponding manner on the inductor part. This single adapter part can easily be formed on the individual adapter parts which are used in the previous embodiment, by mounting them in a plastic frame. The single adapter part has the advantage that the assembly is particularly fast, and that said plastic part can form a protective frame, which can effectively prevent the formation of arcs.

Finally, another alternative is for the fused load disconnector of the type according to at least one embodiment of the invention to be in the form of a completely rebuilt part, as a fused load disconnector base component with a protective housing from which only the plug contacts project on a connecting face. The protective housing then ensures adequate protection. A fused load interrupter such as this can be tailor made for switchgear assemblies having three vertically running busbars.

The switchgear assembly according to at least one embodiment of the invention comprises a fused load interrupter according to at least one embodiment of the invention, which is inserted into this switchgear assembly. This then automatically means that the plug contacts are arranged alongside one another in a horizontal direction.

A fused load disconnector such as this would then normally have to be broader than its height in the installed position. If, according to the possible embodiment mentioned above, it is based on a conventional fused load interrupter as the fused load interrupter base component, then, when it is in its normal position, it is considerably less wide than its height, and is then in the present case just tilted through 90°.

At least one embodiment of the invention also relates to an adapter part for a fused load interrupter which has a first end which can be screwed to connecting lugs with holes of a fused load interrupter (the above fused load interrupter base component) and which has a second end on which a plug contact is formed. This adapter part can quickly convert conventional fused load interrupters to fused load interrupters according to at least one embodiment of the invention.

The adapter part preferably has a U-shaped base body, with one limb of the base body having a hole for a screw to pass through, and with the plug contact being formed in the other limb. The U-shape allows the lower web to have any desired length thus allowing the physical depth of the fused load interrupter to be adapted. This is advantageous because the fused load interrupter may be intended to be used with load interrupters with fuses, and load interrupters with fuses are typically physically deeper.

It is particularly advantageous to produce the adapter part from copper, which is also the most suitable material for the currents that flow and also provides the plug pins of the plug contacts with the necessary flexibility.

BRIEF DESCRIPTION OF THE DRAWINGS

One example embodiment of the invention will be described in the following text with reference to the drawings, in which:

FIG. 2 shows a partially cutaway plan view of a second embodiment of a fused load interrupter according to an embodiment of an embodiment of the invention.

DETAILED DESCRIPTION OF THE EXAMPLE EMBODIMENTS

Figure 1:
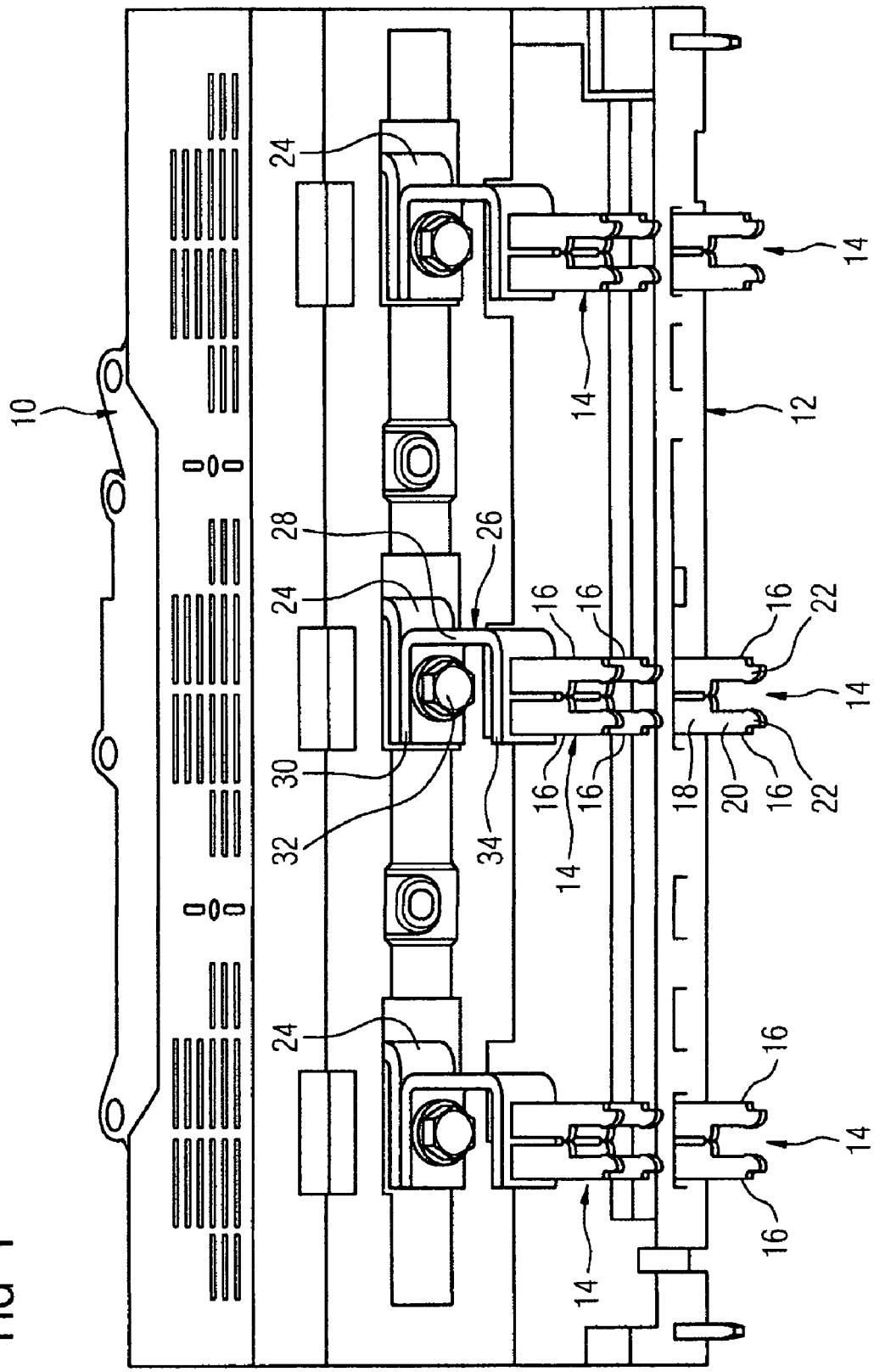
FIG. 1 shows a perspective rear view of a load interrupter with a fuse and of a fused load interrupter according to an embodiment of the invention seated thereon.

In order to illustrate how a connection can be made on each busbar, FIG. 1 shows a rear view of a fused load interrupter 10 according to the invention and of a load interrupter with a fuse 12. Both load interrupters are oriented as they are used in a switchgear assembly having vertically running busbars. Conventionally, the load interrupter 12 with a fuse comprises three plug contacts 14 which are arranged in a straight line and each comprise two plug pins 16. The plug pins have a somewhat broader attachment 18, a narrower intermediate web 20 and a tab 22, which is slightly offset with respect to the intermediate web 20.

Fundamentally, the fused load interrupter 10 illustrated in FIG. 1 is intended for use held tilted at 902 in a switchgear assembly having three horizontally running busbars. For mounting on the horizontally running busbars, the fused load interrupter 10 has three connecting lugs 24, which comprise a hole, which cannot be seen in the figure, for a screw to be passed through. In order to allow the illustrated fused load interrupter 10 to be used in a switchgear assembly having vertically running busbars, the hole in the connecting lug 24 is used for screwing on an adapter part 26. This adapter part 26 comprises a copper U-shaped curve 28 whose first limb 30 is in the form of a plate and likewise has a hole for a screw 32, with the aid of which the curve 28 and thus the adapter part 26 can be firmly screwed to the connecting lug 24. The second limb 34 of the U-shaped curve 28 is likewise in the form of a plate, on which four plug pins 16 are arranged which form a plug contact. The plug pins 16 have the same reference symbols as the plug pins of the plug contact 14 of the load interrupter 12 with the fuse, because they are formed in precisely the same way. Dependent on the rated current of the fused load interrupter 10, two or four such plug pins 16 may be provided.

Direct comparison of the fused load interrupter 10 with the load interrupter 12 with the fuse, which in fact are shown seated one on top of the other in FIG. 1, as will be possible in a switchgear assembly, makes it clear that, as a result of the provision of the adapter 26 on the connecting lug 24 a fused load interrupter which can be used in a switchgear assembly having vertically running busbars can be formed from the fused load interrupter 10 which is intended for use in a switchgear assembly having horizontally running busbars. The adaptation of the conventional fused load interrupter 10 can be further refined, as is illustrated in FIG. 2. In this case, a single (superordinate) adapter part 36 is provided, which comprises and holds three of the abovementioned adapter parts 26. A plastic frame 38 is suitably formed for retention, see in particular the left-hand part of FIG. 2 with a stepped sequence 40 of plastic webs which hold an adapter part 26, and an opposite plastic surface 42. The provision of the plastic frame 38 suppresses the risk of the occurrence of arcs. Since the position of the individual adapter parts 26 in the superordinate adapter part 36 is fixed, the adapter part 36 can also be screwed on rather more easily than the individual adapter parts 26 corresponding to the embodiment shown in FIG. 1.

An embodiment of the invention is in fact implemented by a fused load interrupter 10 having just one plug contact 14 with plug pins 16. While FIG. 1 and FIG. 2 each show how a conventional fused load interrupter can be adapted, it is, of course, also possible for a fused load interrupter with plug contacts to be tailor made directly for switchgear assemblies having vertically running busbars.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE SYMBOLS

10 Fused load interrupter
12 Fuse
14 Plug contacts
16 Plug pins
18 Attachment
20 Intermediate web
22 Tab
24 Connecting lugs
26 Adapter part
28 U-curve
30 First limb
32 Screw
34 Second limb
36 Adapter part
38 Plastic frame
40 Stepped sequence of plastic webs
42 Plastic surface

The invention claimed is:

1. A fused load interrupter, comprising:
   three connections, each for one busbar, the connections being in the form of plug contacts;
   a fused load interrupter base component including three connecting lugs with holes which allow the fused load interrupter base components to be screwed to busbars; and
   an adapter part, on which the plug contacts are formed, screwed to each of the connecting lugs.

2. The fused load interrupter as claimed in claim 1, wherein the plug contacts comprise two plug pins.

3. The fused load interrupter as claimed in claim 1, wherein the fused load interrupter base component includes a protective housing from which only the plug contacts project on a connecting face.

4. The fused load interrupter as claimed in claim 1, wherein the plug contacts comprise four plug pins.

5. An adapter part for a fused load interrupter, comprising:

a first end, screwable to connecting lugs on the fused load interrupter;

a second end, on which a plug contact is formed; and a U-shaped base body, one limb of the U-shaped base body having a hole for a screw to pass through, and another limb including a plug contact being formed therein.

6. The adapter part as claimed in claim 5, wherein the adapter part is produced from copper.

7. A superordinate adapter part comprising:

a plastic housing, in which three adapter parts as claimed in claim 6 are held.

8. A superordinate adapter part comprising:

a plastic housing, in which three adapter parts as claimed in claim 5 are held.

* * * * *